No. 652,251. Patented June 26, 1900.
W. CUNNINGHAM.
REAMING AND BORING TOOL.
(Application filed Nov. 21, 1898. Renewed Nov. 24, 1899.)
(No Model.)
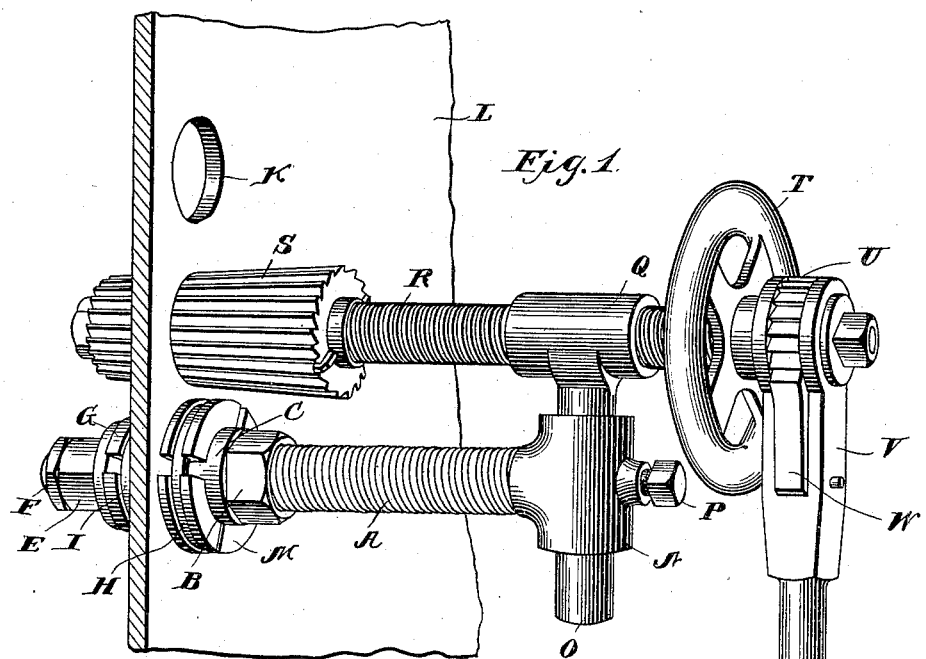
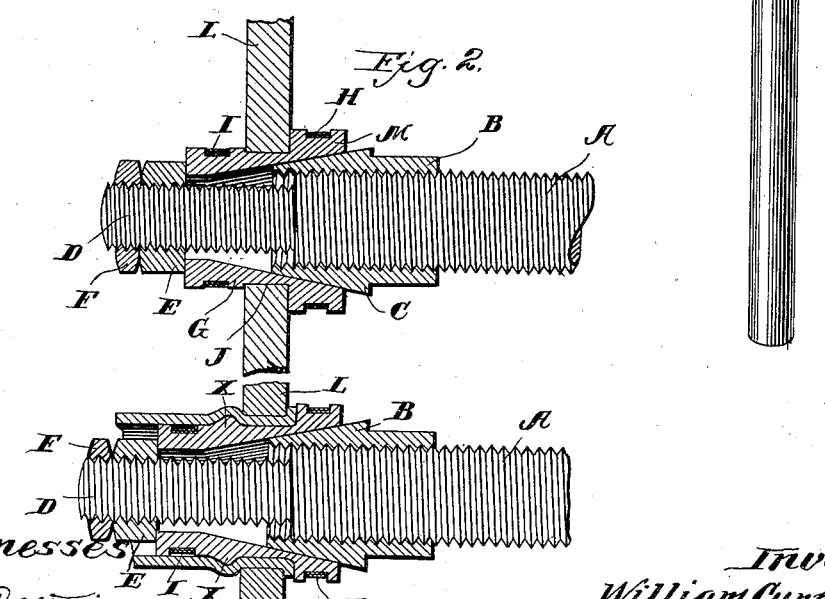
Witnesses
E. C. Wurdeman
Samuel Stuart
Inventor
William Cunningham
by Geo. E. Hazelton Jr.
Attorney

UNITED STATES PATENT OFFICE.

WILLIAM CUNNINGHAM, OF HARRISBURG, PENNSYLVANIA.

REAMING AND BORING TOOL.

SPECIFICATION forming part of Letters Patent No. 652,251, dated June 26, 1900.

Application filed November 21, 1898. Renewed November 24, 1899. Serial No. 738,228. (No model.)

*To all whom it may concern:*

Be it known that I, WILLIAM CUNNINGHAM, a citizen of the United States, residing at Harrisburg, county of Dauphin, and State of Pennsylvania, have invented a certain new and useful Improvement in Reaming and Boring Tools, of which the following is a specification.

My invention relates to a new and useful improvement in reaming and boring tools, and has for its object to provide a simple and effective apparatus of this description which may be attached to a boiler-sheet while in position in the boiler and when so attached permit the boring or reaming of the tube-holes, thereby facilitating the resetting of tubes.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a perspective of an apparatus made in accordance with my improvement, showing the manner of attaching the same to a boiler-sheet; Fig. 2, longitudinal section of the expansion-clamp whereby the apparatus is attached to the boiler-sheet, and Fig. 3 a detail showing the form of expansion-clamp adapted to fit within the tube when in place and be extended in the indentation therein.

In carrying out my invention as here embodied, A represents a threaded arbor upon which is run the nut B, and this nut has formed therewith the tapered plug C. The arbor has an extension D, formed therewith, of reduced diameter, and this extension is also threaded for the reception of the nut E and jam-nut F for the purpose hereinafter set forth.

G represents the expansion-clamp, which is made in sections, as clearly shown in Fig. 1, which are fitted around the tapered plug C and are normally held against said plug by the spring-bands H and I, said bands being set within suitable grooves formed in the clamp, so as to draw the sections thereof against the plug, but permit said plug to expand these sections when forced within the clamp.

An annular groove J is formed in the extension-clamp and is adapted to fit over the edges of the holes K, formed in the boiler-sheet L, so that when the arbor is to be secured to the boiler-sheet the tapered plug is backed out of the extension-clamp, so as to permit the spring-bands to draw the sections of this clamp into the smallest compass, whereby the clamp may be passed through the tube-hole until the enlarged portion M thereof abuts against the outer surfaces of the plate, after which the turning of the nut B upon the arbor in the proper direction will force the tapered plug within the clamp and drive the sections of the latter outward until the groove J engages with the edges of the hole and the clamp is firmly jammed in place, thus holding the arbor in position, it being understood that the nut E prevents any longitudinal movement of the sections of the clamp, and the jam-nut serves to prevent the displacement of the first-named nut.

A socked N is formed with or secured to the outer end of the arbor and is adapted to receive the post O, which latter may be held in any desired adjustment by the set-screw P. The outer end of the post has formed therein a sleeve Q, which is threaded internally for the reception of the feed-screw R, the latter being provided at its inner end with suitable means for the securement thereon of a reamer S or boring-tool, while the outer end of this feed-screw has secured thereon a hand-wheel T and a ratchet U.

A suitable lever V is pivoted around the ratchet-wheel and carries a pawl W for engagement with the ratchet to bring about the revolving of the feed-screw, which not only feeds the reamer or boring-tool inward, but also revolves it upon its axis, so as to cause it to perform its function.

If desired, the socket N may be jointed to the arbor A and suitable clamp mechanism provided for holding this socket in adjustment, the object of which is to vary the angle of the feed-screw relative to the arbor, so as to accommodate the tool to the hole in which it is to be inserted. It is obvious from this description that when a tube-hole is to be reamed for the resetting of a tube it may be quickly accomplished by clamping the apparatus in position and properly manipulating the revolving and feeding mechanism to bring about the result. It sometimes happens that a single tube becomes damaged and must be removed from the boiler and another substituted therefor, in which case it is essential that the clamp be adapted to secure the apparatus in place by being inserted within one of the remaining tubes, and this may be accomplished by the use of a clamp the sections of which are formed as shown in Fig. 3—that is to say, these sections are provided with beveled ribs X, said ribs being of the proper shape to fit within the offset formed in the end of the tube to facilitate its securement within the boiler-sheet. Thus by the use of my apparatus when a tube becomes damaged it may be easily removed from the boiler. The hole wherein it was expanded may be trued by another tube being expanded therein. This is of great advantage, since heretofore much time and labor have been necessary to accomplish the result, and when accomplished it was of an inferior character.

It will of course be obvious that the apparatus may be used for boring or drilling in the same manner as when being used for reaming.

Having thus fully described my invention, what I claim as new and useful is—

1. A support for a reaming and boring apparatus consisting of a threaded arbor, stop-nuts thereon, and an extension-clamp comprising grooved sections, springs for clamping the sections, a beveled rib formed on each section and a beveled plug for expanding the sections, substantially as described.

2. In combination, a threaded arbor, a nut run thereon, a tapered plug formed with said nut, an extension-clamp located upon the arbor and adapted to receive the plug, said nuts located upon the extension of the arbor for preventing longitudinal movement of the clamp, springs for drawing the sections of the clamp together, and means carried by the arbor for operating a reaming or boring tool, as and for the purpose set forth.

3. The herein-described combination of a threaded arbor, a nut run thereon, a tapered plug formed with said nut, an extension-clamp consisting of sections, spring-bands for holding said sections together, a stop-nut for preventing the longitudinal movement of the clamp, a socket formed on the outer end of the arbor, a post fitted within said socket, a threaded sleeve carried by the upper end of the post, a feed-screw passed through the sleeve, and ratchet mechanism for operating the feed-screw to cause the tool to perform its function, as and for the purpose set forth.

4. In a support for a boring-tool, a clamp formed in sections, each section having a series of recesses in its face, the central recess being adapted to receive the edge of the plate, and spring-bands lying in the recesses on either side for clamping the parts together, a cone-shaped nut for expanding the spring-bands and forcing the sections of the clamp into engagement with the plate, substantially as described.

In testimony whereof I have hereunto affixed my signature in the presence of two subscribing witnesses.

WILLIAM CUNNINGHAM.

Witnesses:
HORACE E. REIDLINGER,
FERGUSON E. TRACY.